(12) United States Patent
Kurosawa

(10) Patent No.: US 8,055,245 B2
(45) Date of Patent: Nov. 8, 2011

(54) MOBILE DEVICE WITH FAKE COMMUNICATION MODE

(75) Inventor: Noriyuki Kurosawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 454 days.

(21) Appl. No.: 12/363,632

(22) Filed: Jan. 30, 2009

(65) Prior Publication Data

US 2009/0197578 A1 Aug. 6, 2009

(30) Foreign Application Priority Data

Jan. 30, 2008 (JP) ................................. 2008-018932

(51) Int. Cl.
*H04M 3/42* (2006.01)
(52) U.S. Cl. ..................................... 455/414.1; 455/567
(58) Field of Classification Search .............. 455/414.1, 455/567, 404.1
See application file for complete search history.

(56) References Cited

U.S. PATENT DOCUMENTS

| 6,553,221 B2 * | 4/2003 | Nakamura et al. ............ 455/415 |
| 6,775,538 B2 * | 8/2004 | Forbes et al. ............... 455/414.1 |

FOREIGN PATENT DOCUMENTS

| JP | 2002344579 | 11/2002 |
| JP | 2002344579 A | * 11/2002 |

* cited by examiner

*Primary Examiner* — Nick Corsaro
*Assistant Examiner* — Sowmini Nair
(74) *Attorney, Agent, or Firm* — Morrison & Foerster LLP

(57) ABSTRACT

A mobile wireless device and technology operable to provide a fake calling function is disclosed. A fake communication mode allows a user to simulate communicating with another party in order to deter unwanted interruption by another person. When a real call occurs during the fake communication mode, the real call is handled so that the ring volume is not too loud for the user, while not breaking the illusion of the fake call.

15 Claims, 7 Drawing Sheets

MOBILE DEVICE WITH FAKE COMMUNICATION MODE

CROSS-REFERENCE TO RELATED APPLICATION

The present application claims priority under 35 U.S.C. §119 to Japanese Patent Application No. 2008-018932, filed on Jan. 30, 2008, entitled "MOBILE WIRELESS DEVICE," the entirety of which is incorporated by reference herein.

BACKGROUND OF THE INVENTION

1. Field of the Invention
The invention relates generally to mobile wireless devices, and e-mail message. To meet demands for smaller mobile phones, these speakers are often arranged close to each other.
2. Description of the Related Art
If there is a real incoming call while the user is holding the receiving speaker of the mobile phone to his/her ear for a fake call, a normal alert operation performed by, for example, outputting a loud ringtone from the external output speaker may cause discomfort to the user.

A normal call provided by a phone function is given high priority among other operations of the mobile phone. Therefore, a normal call in progress is allowed to prohibit other applications from interrupting. The normal call is thus allowed to prevent an alert operation, such as outputting a sound from the external output speaker, from being performed during the normal call. However, during a fake call, if there is a high-priority interrupt, such as an incoming call, it is difficult to prevent the corresponding alert operation, such as outputting a sound from the external output speaker. Accordingly, there is a need for mobile wireless devices which are operable to restrict alert operations during a fake call and thereby to reduce user discomfort.

SUMMARY OF THE INVENTION

The exemplary embodiments described herein are directed to solving one or more of the problems presented in the prior art, as described above, as well as providing additional features that will become readily apparent by reference to the following detailed description when taken in conjunction with the accompanying drawings.

A mobile wireless device and technology operable to provide a fake calling function is disclosed. A fake communication mode allows a user to simulate communicating with another party in order to deter unwanted interruption by another person. When a real call occurs during the fake communication mode, the real call is handled so that the ring volume is not too loud for the user, while not breaking the illusion of the fake call.

One embodiment of the present invention comprises a mobile wireless device. The mobile wireless device comprises a communication unit configured to perform a voice communication, a call speaker configured to output a voice in response to the voice communication, and an operation unit configured to perform a predetermined operation during the voice communication. The mobile wireless device also comprises a fake communication mode setting unit configured to set a fake communication mode allowing the predetermined operation to be performed when the communication unit is not performing the voice communication. The mobile wireless device further comprises an operation control unit configured to cause the operation unit to perform the predetermined operation in the fake communication mode, and an alert operation restricting unit configured to restrict an alert operation if an event involving the alert operation occurs in the fake communication mode.

One embodiment of the present invention comprises a mobile wireless device. The mobile wireless device comprises a communication unit configured to receive a communication, and means for performing an alert operation when the communication is received by the communication unit. The mobile wireless device also comprises means for performing a fake communication, and means for restricting the alert operation if an event involving the alert operation occurs during the fake communication. The mobile wireless device further comprises means for controlling an alert which provides notification in response to a reception of a communication by the communication unit during the fake communication.

One embodiment of the invention comprises an alert method for a mobile wireless device. The alert method comprises executing a fake communication operation comprising performing a predetermined operation when a voice communication is not executed. The alert method also comprises controlling an alert operation if the voice communication is received during execution of the fake communication operation.

BRIEF DESCRIPTION OF THE DRAWINGS

Exemplary embodiments of the invention are described in detail below with reference to the following Figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure.

DETAILED DESCRIPTION OF EXEMPLARY EMBODIMENTS

Figure 1A:
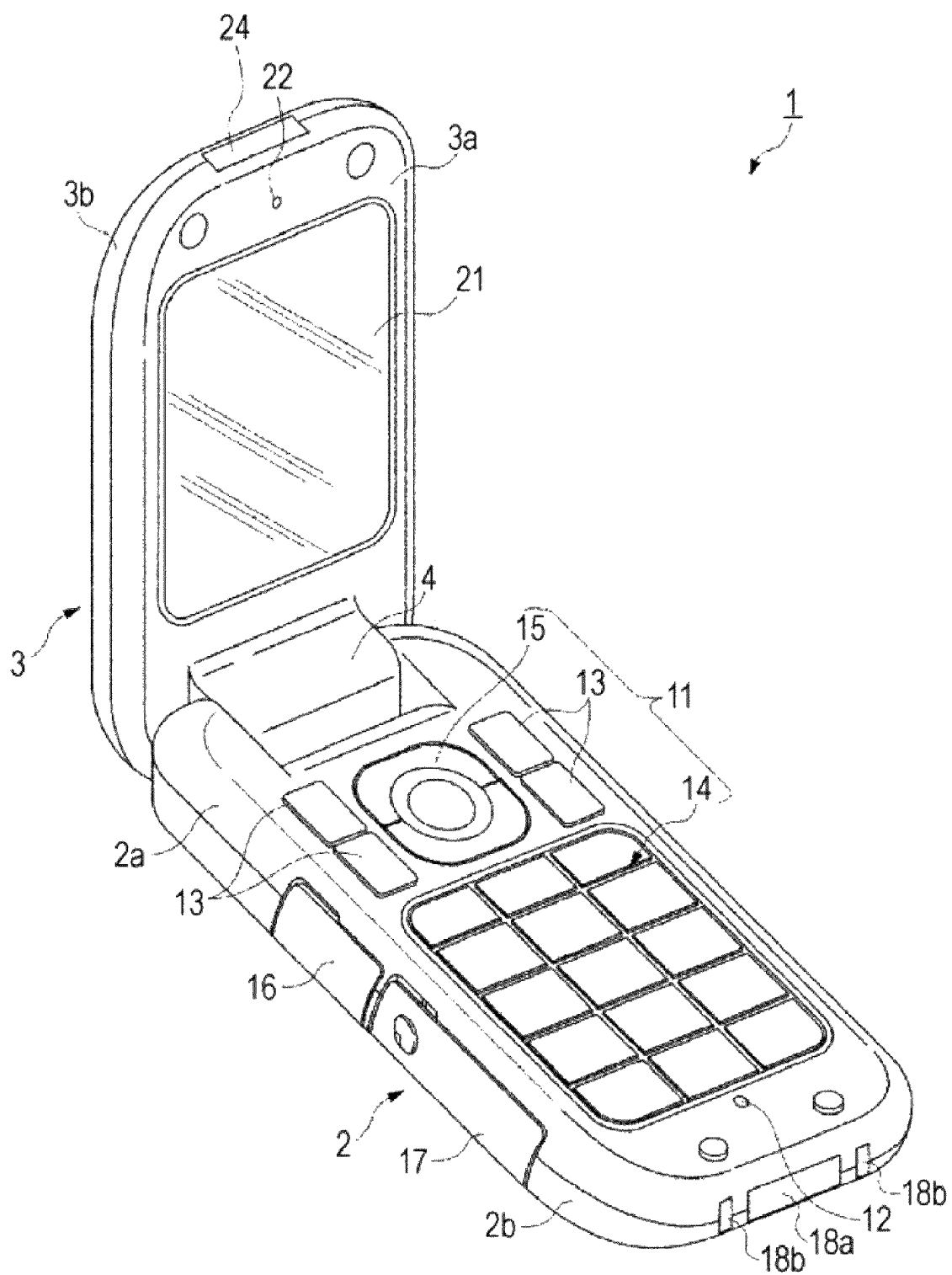
FIG. 1A is an illustration of an external perspective view of a mobile phone in an open position.

The following description is presented to enable a person of ordinary skill in the art to make and use the invention. The following detailed description is exemplary in nature and is not intended to limit the disclosure or the application and uses of the embodiments of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the invention are described herein in the context of one practical non-limiting application, namely, a simulated fake communication call on a foldable mobile phone. Embodiments of the disclosure, however, are not limited to such mobile phone applications, and the techniques described herein may also be utilized in other devices as mentioned below in the context of discussion of FIGS. 1A and 1B, or in other types of portable electronic devices. For example, embodiments may be applicable to laptop computers, netbook computers, notebook computers, and other wired or wireless mobile communication device having a communication function.

As would be apparent to one of ordinary skill in the art after reading this description, these are merely examples, and the embodiments of the invention are not limited to operating in accordance with these examples. Other embodiments may be utilized and structural changes may be made without departing from the scope of the exemplary embodiments of the present disclosure.

The device described herein is one example embodiment of the disclosure. Embodiments of the present disclosure may be practiced with a variety of different portable electronic device configurations, systems, and electronic circuits. Those skilled in the art will appreciate that, for the sake of brevity, conventional techniques and components related to wireless mobile phones and other functional aspects of the portable electronic device and the individual operating components of the device may not be described in detail herein.

The following description is presented to enable a person of ordinary skill in the art to make and use embodiments of the disclosure. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

A fake communication mode, which allows a user to simulate communicating with another party in order to deter unwanted interruption by another person is disclosed. When a real call occurs during the fake communication mode, the ring volume due to occurrence of a real call is reduced or eliminated. Exemplary embodiments of the disclosure are described below with reference to the drawings.

Figure 1B:
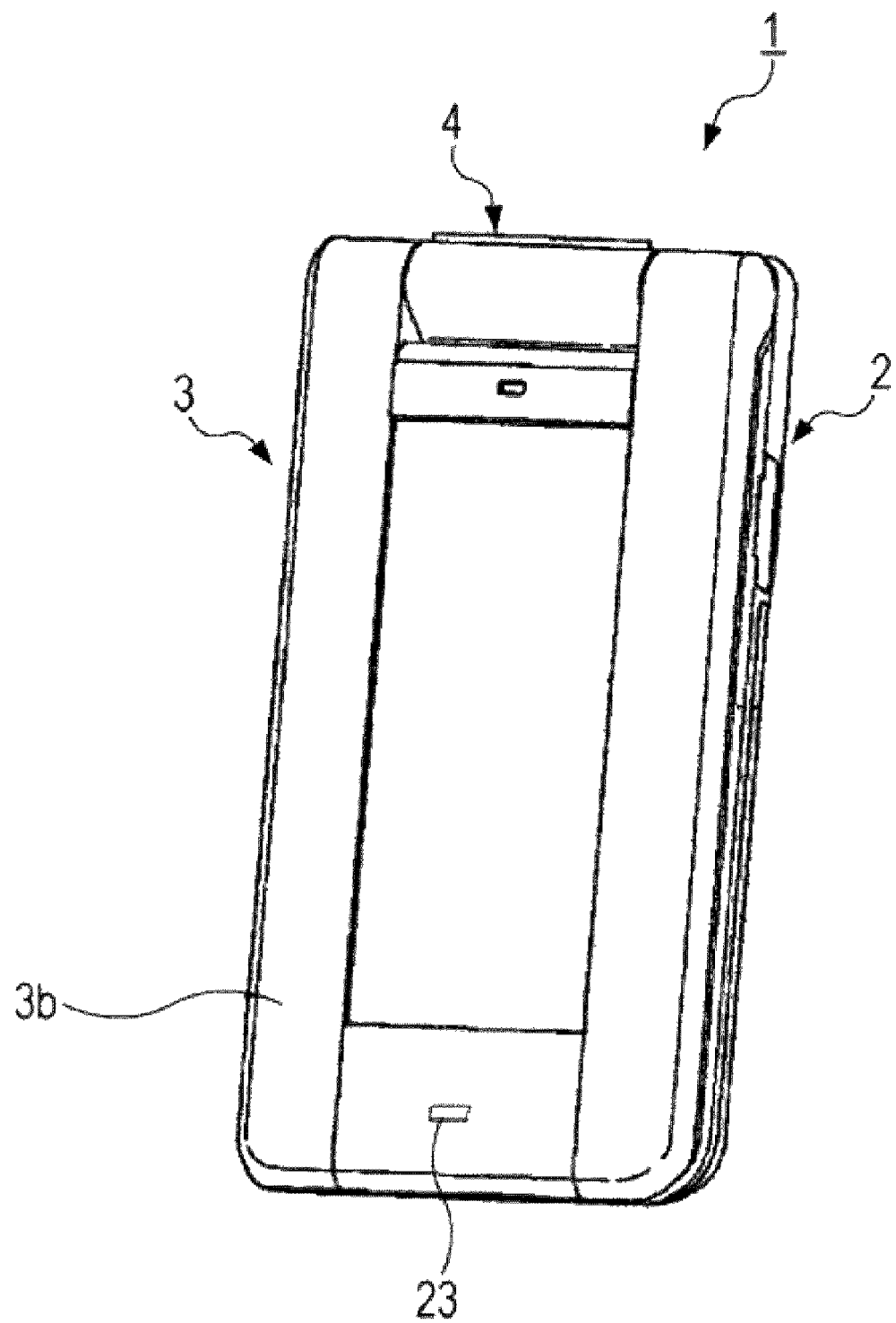
FIG. 1B is an illustration of an external perspective view of the mobile phone of FIG. 1A in a closed position.

FIG. 1A and FIG. 1B are external perspective views of a mobile phone 1 capable of communicating with external devices or a base station according to an embodiment of the disclosure. FIG. 1A is an illustration of an external perspective view of a mobile phone in an open position. FIG. 1B is an illustration of an external perspective view of the mobile phone of FIG. 1A in a closed position. The mobile phone 1 comprises an operating housing 2, a display housing 3, and a hinge mechanism 4 connecting the operating housing 2 and the display housing 3.

As shown in FIG. 1A, the mobile phone 1 may comprise an operating housing 2 having an operating section, a display housing 3 having a display section, and a hinge mechanism 4 connecting the operating housing 2 and the display housing 3. The exterior of the operating housing 2 may be formed by a front case 2a and a rear case 2b. The exterior of the display housing 3 may be formed by a front case 3a And a rear case 3b.

The operating housing 2 may include an operation button group 11 and a voice input part 12 that may be exposed to a surface of the front case 2a. The operation button group 11 may include function setting operation buttons 13, input operation buttons 14, and determination operation buttons 15. The function setting operation buttons 13 can be used to activate various settings and functions, such as an address book function and an e-mail function. The input operation buttons 14 may be assigned numbers and characters, and may be used to enter phone numbers or characters to create an e-mail message. The determination operation buttons 15 may be used, for example, to confirm determinations and perform scrolling in various operations. A side of the operating housing 2 is provided with an earphone connector cap 16 and a cap 17 for covering an interface (not shown) for communicating with external devices (or a base station). A lower end of the operating housing 2 is provided with a cap 18a for covering a charging connector (not shown) and a pair of charging contacts 18b. The voice input part 12 can be used to input a voice from the user of the mobile phone 1 (e.g., during a call).

The display housing 3 may include a display 21 for displaying various kinds of information, a call speaker 22 configured to output a voice of a person at the other end, and an external output speaker 23 (FIG. 1B) configured to externally output a sound upon receipt of an incoming e-mail message or call. An upper end of the display housing 3 may include an infrared communication unit 24 configured to perform infrared communication with other mobile phones and the like. As illustrated in FIG. 1B, the external output speaker 23 may be located on the back side of the display housing 3 (i.e., on the rear case 3b) such that a sound can be externally output even when the mobile phone 1 is folded (i.e., closed position). Alternatively, the external output speaker 23 may be located on the back side of the operating housing 2 (i.e., on the rear case 2b).

The hinge mechanism 4 is operable to connect the operating housing 2 and the display housing 3 to allow their relative movement. The hinge mechanism 4 allows the mobile phone 1 to switch between an in-use state (open position) and a stored state (folded state or closed position). In the in-use state, the operating housing 2 and the display housing 3 are generally open with respect to each other. In the stored state, the front side of the operating housing 2 and the front side of the display housing 3 generally face each other.

As explained above, embodiments of the disclosure are described in the context of one practical non-limiting application, namely, simulating a fake communication call on a foldable mobile phone such as the mobile phone 1. In the mobile phone 1, the operating housing 2 and the display housing 3 can move relative to each other via the hinge mechanism 4. However, the present disclosure is applicable, for example, without limitation, to a slidable mobile phone. In a slidable mobile phone, one of the operation-unit housing 2 and the display-unit housing 3 can be slid relative to the other one. The slide may be in a certain direction from the state in which the operation-unit housing 2 and the display-unit housing 3 are stacked on each other. The present disclosure is also applicable, for example, without limitation, to a rotational mobile phone. In a rotational mobile phone, one of the operation-unit housing 2 and the display-unit housing 3 can be rotated relative to the other one. The rotation may be about a line which extends in a direction in which the operation-unit housing 2 and the display-unit housing 3 are stacked on each other. The present disclosure is also applicable, for example, without limitation, to a mobile phone in which the operating housing 2 and the display housing 3 are connected to each other through a two-axis hinge.

Figure 2:
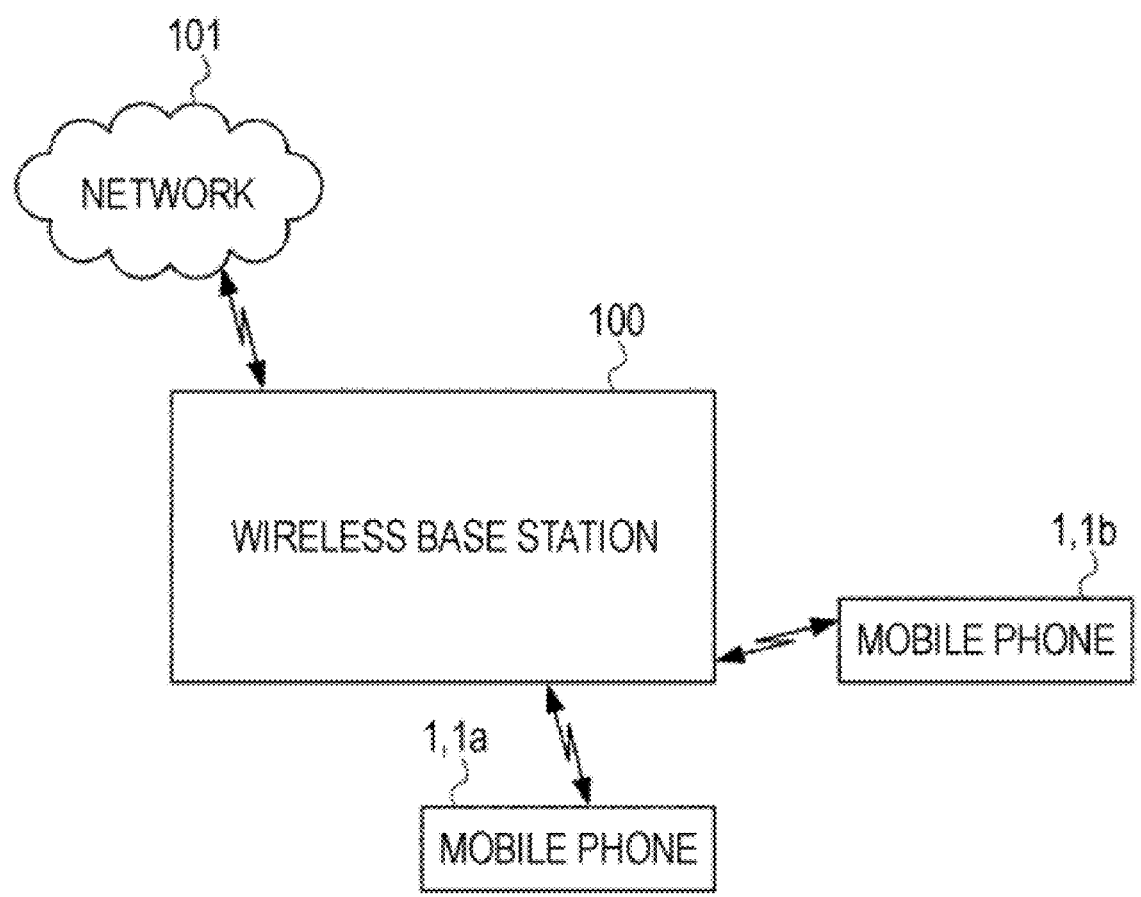
FIG. 2 is a schematic view illustrating mobile phones connected to a network via a wireless base station according to an embodiment of the disclosure.

FIG. 2 is a schematic view illustrating mobile phones connected to a network via a wireless base station according to an embodiment of the disclosure. As illustrated in FIG. 2, mobile phones 1 (1*a* and 1*b*) are connected via a wireless connection such that they communicate with a network 101 via a wireless base station 100. For crime prevention purposes and the like, a fake communication capability is provided in the mobile phone 1. The mobile phone 1 provides a function which allows the user to simulate an incoming call and pretend to talk on the mobile phone 1 when there may not be an actual incoming call (hereinafter, this is referred to as fake communication). Additionally, if an interrupt occurs during the fake communication, the mobile phone 1 restricts output of a sound from a speaker (e.g., external output speaker 23). The interrupt may include, without limitation, an alarm sound when a set time is reached, an incoming call, or an incoming e-mail message.

Figure 3:
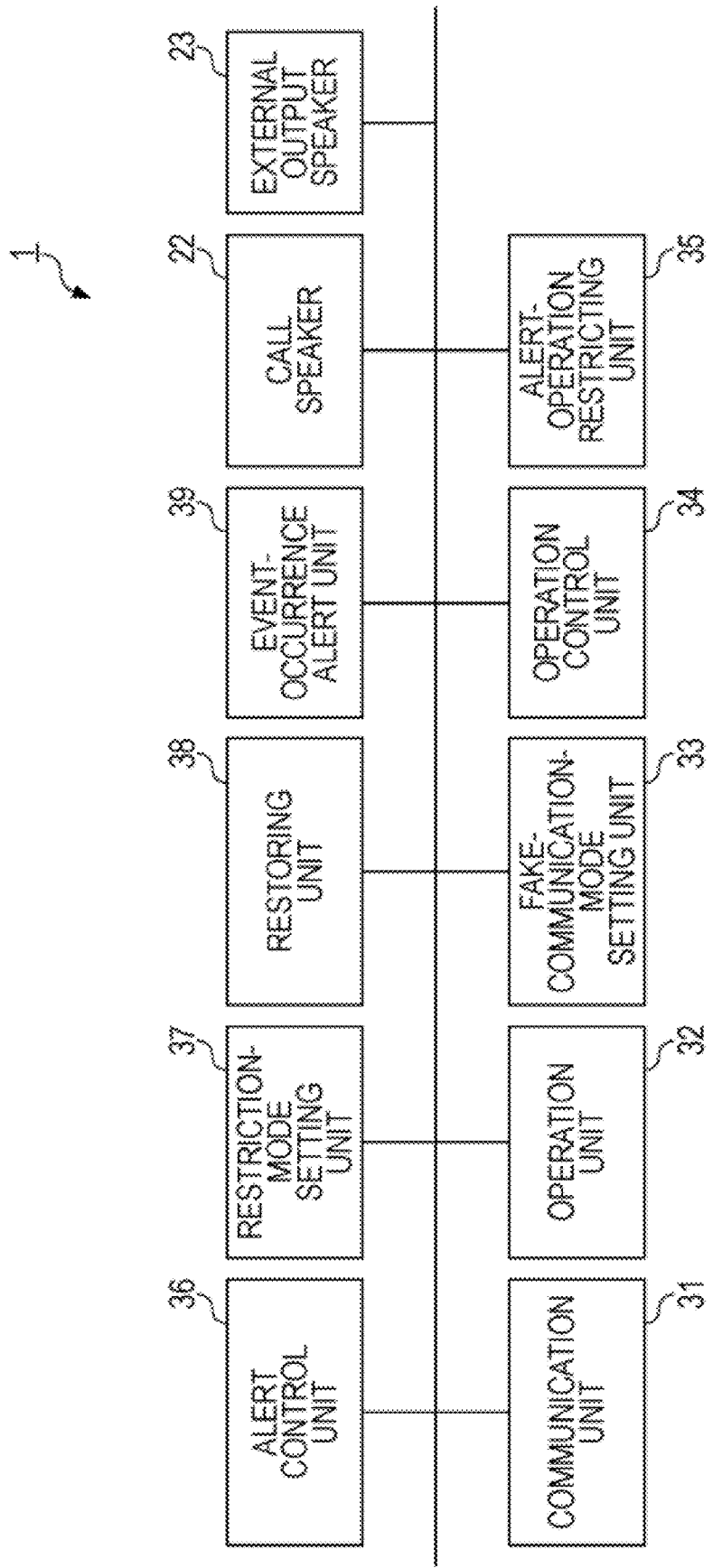
FIG. 3 is a functional block diagram illustrating functions of the mobile phone of FIGS. 1A and 1B according to an embodiment of the disclosure.

FIG. 3 is a functional block diagram illustrating functions of the mobile phone 1 of FIGS. 1A and 1B. The functional blocks of the mobile phone 1 may comprise a communication unit 31, an operation unit 32, a fake communication mode setting unit 33, an operation control unit 34, an alert operation restricting unit 35, an alert control unit 36, a restriction-mode setting unit 37, a restoring unit 38, and an event-occurrence alert unit 39. The functional blocks of the mobile phone 1 may also comprise the call speaker 22 and external output speaker 23, as described above in the context of discussion of FIG. 1.

The communication unit 31 is configured to perform a voice communication (phone function). The call speaker 22 is configured to output a voice in response to the voice communication performed by the communication unit 31.

The operation unit 32 is configured to perform a predetermined operation when the voice communication is performed. The predetermined operation performed by the operation unit 32 is an operation that is set in advance for the mobile phone 1 as an operation performed in response to an incoming call or during a call. Examples of such an operation include outputting a ringtone and causing a light such as a light-emitting diode (LED) to illuminate.

The fake communication mode setting unit 33 is configured to set a fake communication mode allowing the predetermined operation to be performed when the communication unit 31 may not be performing voice communication. The fake communication mode is a mode where the mobile phone 1 performs a fake incoming call operation when no real incoming call is currently received. That is, in the fake communication mode, the mobile phone 1 performs the same operation as that performed upon receipt of a real incoming call, thereby allowing the user to simulate a real incoming call. Additionally, in the fake communication mode, in response to a user's response to the fake incoming call operation, the mobile phone 1 makes a transition to the same operation as that performed during a real call, thereby allowing the user to pretend to talk on the mobile phone 1.

The operation control unit 34 is configured to cause the operation unit 32 to perform the predetermined operation in the fake communication mode.

The alert operation restricting unit 35 is configured to restrict an alert operation if an event involving the alert operation occurs in the fake communication mode. For example, an event may include an incoming voice call that occurs during the fake communication mode. Other examples of the event may include an incoming text message, such as an incoming e-mail message, and an alarming operation performed when set time is reached. In other words, the event may be of any type that involves an alert operation. The alert operation associated with the occurrence of an event, may be without limitation, output of a sound. The alert indicating the occurrence of an event may also be provided by vibration of a vibrator, illumination of a light-emitting unit, display of information on the display section, and the like.

In one embodiment, in the fake communication mode, if there is an occurrence of an event involving an alert operation (e.g., an alarm sounds when a set time is reached, on an incoming call, or on an incoming e-mail message), that is, if an interrupt occurs when a software application or communication starts, the mobile phone 1 restricts the alert operation associated with the alert operation event. Restricting may mean, for example, lowering the sound volume. In this manner, the user is not disturbed by the alert operation, and her/his discomfort can be reduced.

For example, while an operation unit 32 is performing a predetermined operation in the fake communication mode set by the fake communication mode setting unit 33, if an event involving an alert operation related to output of a sound occurs, the alert operation restricting unit 35 restricts the alert operation.

For another example, if an event involving an alert operation occurs when an application starts, in the fake communication mode, the alert operation associated with the event is restricted. In this manner, since the user is not disturbed by output of a sound, her/his level of discomfort is reduced.

In one embodiment, when an event involving an alert operation occurs, the external output speaker 23 outputs the corresponding sound, such as a ringtone or alarm tone, to the exterior of the mobile phone 1. While the operation unit 32 is performing a predetermined operation in the fake communication mode set by the fake communication mode setting unit 33, if an event involving an alert operation related to output of a sound occurs, the alert operation restricting unit 35 restricts the alert operation by restricting the output of a sound from the external output speaker 23.

In the fake communication mode, if there is an occurrence of an event involving an alert operation related to output of a sound from the external output speaker 23 to the exterior of the mobile phone 1 (i.e., if an interrupt occurs when an application starts), the alert operation associated with the event is restricted. Thus, since the output of a sound from the external output speaker 23 is restricted, user discomfort can be reduced.

The mobile phone 1 may include an alert control unit 36. When an alert operation involving output of a sound from the external output speaker 23 is restricted, the alert control unit 36 performs control such that the user is alerted to the occurrence of an event by a sound from the call speaker 22.

In the fake communication mode, if an event involving an alert operation occurs (i.e., if an interrupt occurs when an application starts), the alert operation associated with the event is restricted. Thus, since the alert operation involving output of a sound from the external output speaker 23 is restricted, the user's discomfort can be reduced. Additionally, when the alert operation is restricted, the user can be alerted to the occurrence of the event through the call speaker 22 held to the user's ear. This allows the user not only to recognize the occurrence of the event, but also to determine whether to ignore the event. That is, a determination as to whether to continue, suspend, or terminate the fake call can be determined by the user who is making the fake call and thus, enhanced usability can be achieved.

The restriction-mode setting unit 37 is configured to set a restriction mode which restricts at least output of a sound from the external output speaker 23. The alert operation restricting unit 35 sets the restriction mode when the fake communication mode is set. The restriction mode is similar to an operation mode, such as a so-called silent mode. In order to alert the user to an incoming call, the restriction mode restricts output of a sound, but allows, for example, a vibrator to vibrate, a lamp to light up, and/or the display 21 to display an alert message. If there is a real incoming call during the fake communication mode, an alert operation made by vibration of the vibrator may cause discomfort to the user. Therefore, in one embodiment, the vibrator may be set not to vibrate in the fake communication mode.

The restoring unit 38 stores settings of the restriction mode, the settings being used before the fake communication mode is set. When the fake communication mode is cancelled, the restoring unit 38 restores settings of the restriction mode to the stored settings.

Thus, when the fake communication mode is cancelled, the stored settings used prior to the start of the fake communication mode can be restored. This can save the user from having to set the settings again, and thus enhances usability.

The event-occurrence alert unit 39 is configured to alert the user to the occurrence of an event for which the corresponding alert operation was restricted by the alert operation restricting unit 35 in the fake communication mode.

In this manner, when the fake communication mode is cancelled, it is possible to alert the user to the occurrence of an event, which was not recognized by the user due to restriction on the alert operation in the fake communication mode. This enhances usability of the mobile wireless device.

Figure 4:
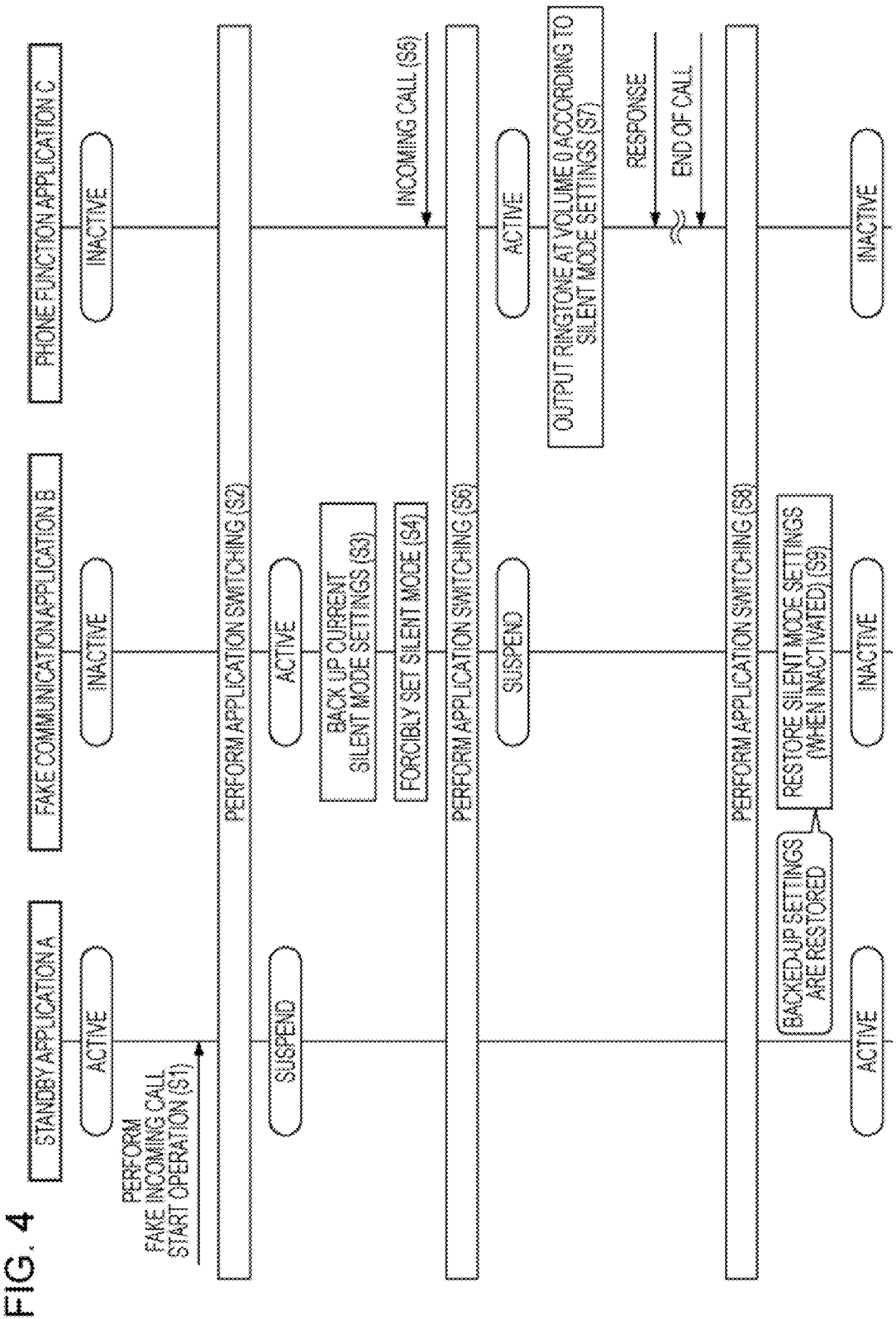
FIG. 4 is a timing diagram illustrating a process where a fake communication mode is set by the mobile phone of FIGS. 1A and 1B, and an interrupt caused by an incoming call occurs in the fake communication mode according to an embodiment of the disclosure.
Figure 5:
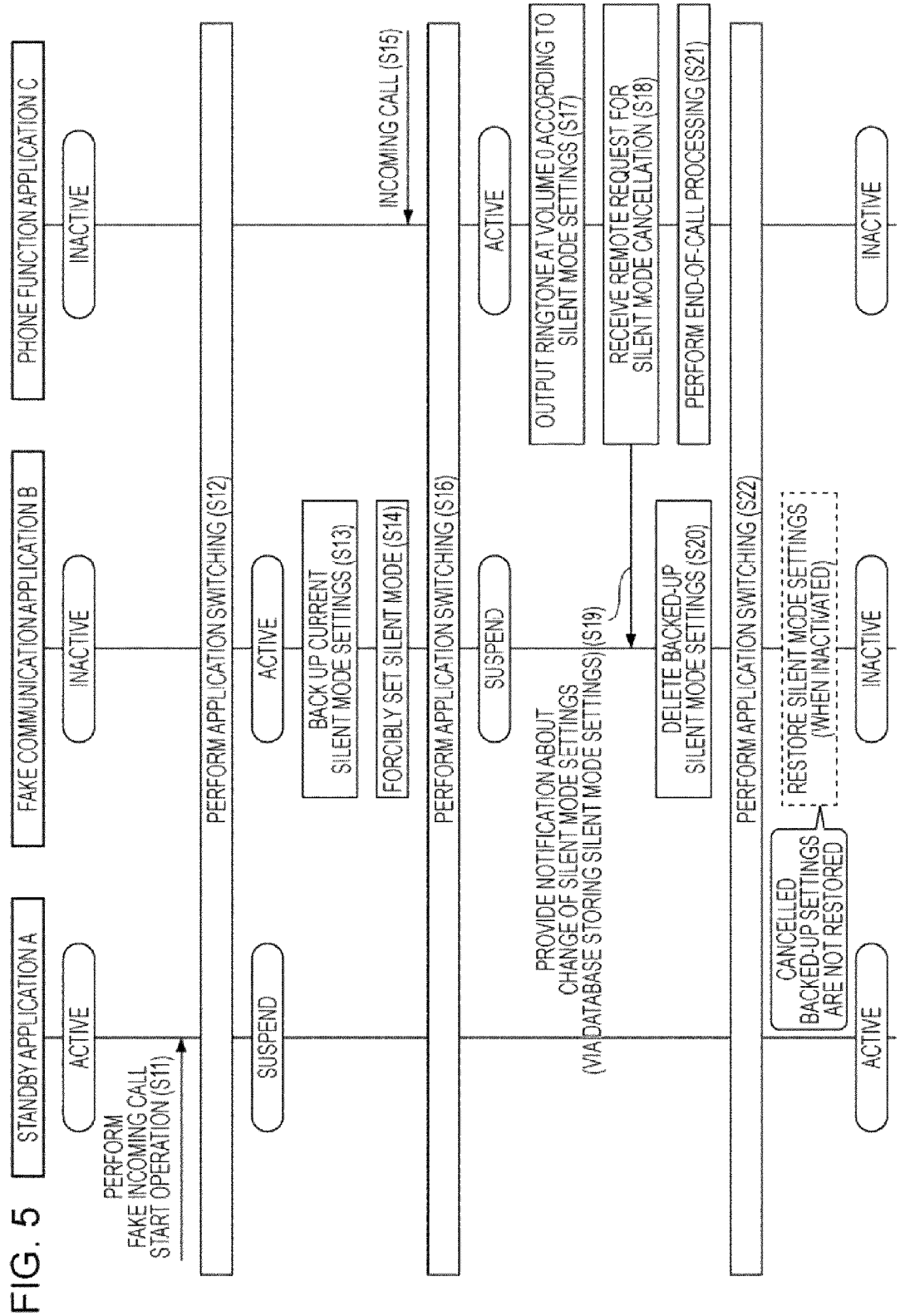
FIG. 5 is a timing diagram illustrating a process where the fake communication mode is set by the mobile phone of FIGS. 1A and 1B and processing for changing settings of a silent mode takes place in the fake communication mode according to an embodiment of the disclosure.
Figure 6:
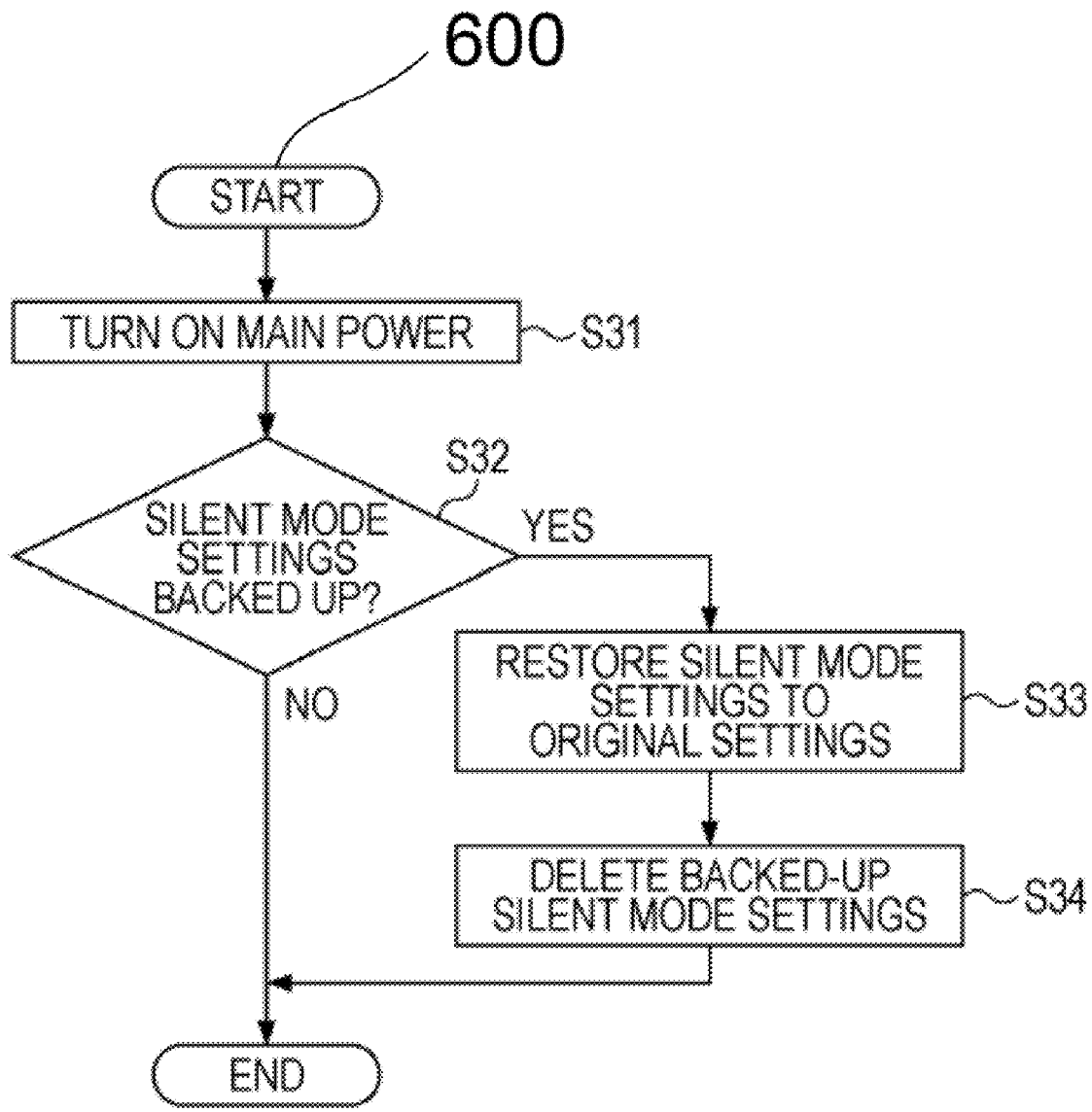
FIG. 6 is a flowchart illustrating processing performed to restore settings of the silent mode when main power is turned ON according to an embodiment of the disclosure.

FIGS. 4-6 illustrate processes 400-600 according to embodiments of the disclosure. The various tasks performed in connection with processes 400-600 may be performed by software, hardware, firmware, or any combination thereof. For illustrative purposes, the following description of processes 400-600 may refer to elements mentioned above in connection with FIGS. 1A-1B, and 2-3. In practical embodiments, portions of processes 400-600 may be performed by different elements of the described system, e.g., the communication unit 31, the operation unit 32, the fake communication mode setting unit 33, the operation control unit 34, the alert operation restricting unit 35, the alert control unit 36, the restriction-mode setting unit 37, the call speaker 22, and/or the external output speaker 23. Processes 400-600 may include any number of additional or alternative tasks. The tasks shown in FIGS. 4-6 need not be performed in the illustrated order, and processes 400-600 may be incorporated into a more comprehensive procedures or processes having additional functionality not described in detail herein.

FIG. 4 contains a timing diagram illustrating a process 400 where a fake communication mode is set by the mobile phone of FIGS. 1A and 1B and an interrupt caused by an incoming call occurs in the fake communication mode according to an embodiment of the disclosure.

As shown in FIG. 4, initially, a standby application A (e.g., an email process) may be in an active state (operating state), a fake communication application B may be in an inactive state (non-operating state), and a phone function application C (e.g., call handling process) may be in an inactive state (non-operating state). Activating (e.g., pressing) a predetermined key (e.g., side key) of the mobile phone 1 allows the user to either set or cancel the fake communication mode. Setting the fake communication mode puts the fake communication application B into the active state (operating state), while canceling the fake communication mode puts the fake communication application B into the inactive state (non-operating state).

If activation of a predetermined key of the mobile phone 1 is detected when the standby application A is in the active state (step S1), the mobile phone 1 performs application switching (step S2).

After the application switching is performed in step S2, the standby application A enters a suspend state (standby state), while the fake communication application B enters the active state by setting the fake communication mode.

After backing up current settings of the restriction mode, such as the silent mode (step S3), the fake communication application B forcibly sets the silent mode (step S4) via the restriction-mode setting unit 37. Thus, when the fake communication application B is in the active state, the user can simulate a real incoming call and pretend to talk on the mobile phone 1. For example, when the user operates the mobile phone 1 to start a call in response to a fake ringtone melody output from the external output speaker 23, a light-emitting part (e.g., LED) blinks. The light-emitting part may be located on the back side of the display housing 3 (i.e., located in an area viewable by others). Alternatively, the mobile phone 1 may be configured to output a voice from the call speaker 22. The voice may be based on fake conversation data stored in an internal memory (not shown), to prompt the user to start a conversation as in the case of a real call.

If there is a real incoming call, that is, if an interrupt occurs during the fake call (step S5), the process 400 performs application switching (step S6).

After the application switching is performed in step S6, the fake communication application B enters the suspend state, while the phone function application C enters the active state in response to the incoming call. Then, unlike in the case where the restriction mode is not set, the process 400 restricts the alert operation in accordance with the restriction mode (e.g., silent mode) forcibly set in step S4. For example, process 400 restricts the alert operation to alert the user to the incoming call by outputting a ringtone at a predetermined volume level, such as, without limitation, a lower volume such as zero (step S7). In the restriction mode, a sound does not necessarily need to be output at a volume level of zero. For example, a sound may be output at any volume level lower than that in the case where the restriction mode is not set. That is, the alert operation performed in response to an event in the restriction mode may be any alert operation that is restricted compared to that performed in response to the same event in the case where the restriction mode is not set.

In this manner, when the user can respond to the real incoming call, a voice call can be actually performed. After the end of the incoming call, the process 400 performs application switching (step S8).

After the application switching is performed in step S8, the fake communication application B cancels the silent mode (restriction mode) set in step S4. The fake communication application B then performs processing to restore the settings backed up in step S3 (step S9) via the restoring unit 38. Then, the standby application A enters the active state, while the fake communication application B and the phone function application C enter the inactive state. When the fake communication application B is in the active state, if the fake communication mode is cancelled without any occurrence of an event involving an alert operation (e.g., an alarm, an incoming call, or an incoming e-mail message), the processing following step S8 is performed. That is, the fake communication application B performs processing to restore the settings backed up in step S3.

FIG. 5 is a timing diagram illustrating a process 500 where the fake communication mode is set by the mobile phone 1 of FIGS. 1A and 1B and processing for changing settings of a silent mode takes place in the fake communication mode according to an embodiment of the disclosure.

As shown in FIG. 5, initially the standby application A is in the active state (operating state), the fake communication application B is in the inactive state (non-operating state), and the phone function application C is in the inactive state. Activating (e.g., pressing) a predetermined key (e.g., side key) of the mobile phone 1 allows the user to either set or cancel the fake communication mode.

If activation of a predetermined key of the mobile phone 1 is detected when the standby application A is in the active state (step S11), the mobile phone 1 performs application switching (step S12).

After the application switching is performed in step S12, the standby application A enters the suspend state (standby state), while the fake communication application B enters the active state by setting the fake communication mode.

After backing up current settings of the restriction mode, such as the silent mode (step S13), the fake communication application B forcibly sets the silent mode (step S14). Thus, when the fake communication application B is in the active state, the user can simulate a real incoming call and pretend to talk on the mobile phone 1 as explained above.

If there is a real incoming call, that is, if an interrupt occurs during the fake call (step S15), the process 500 performs application switching (step S16).

After the application switching is performed in step S16, the fake communication application B enters the suspend state, while the phone function application C enters the active state in response to the incoming call. Then, the process 500 restricts the alert operation in accordance with the restriction mode (e.g., silent mode) forcibly set in step S14. For example, the mobile phone 1 restricts the alert operation to alerting the user to the incoming call by outputting a ringtone at a predetermined volume level, such as zero (step S17).

If a remote request for canceling the restriction mode (e.g., silent mode) is received from a mobile wireless device at the other end of the mobile phone 1 (step S18), notification about the change of the restriction mode is provided to the fake communication application B (step S19). The notification is provided via a database that stores the settings of the restriction mode.

The fake communication application B deletes the settings of the restriction mode, the settings being backed up in step S13 (step S20).

Upon completion of end-of-call processing or canceling the fake communication mode (step S21), the process 500 performs application switching (step S22).

After the application switching is performed in step S22, the standby application A enters the active state, while the fake communication application B and the phone function application C enter the inactive state. Thus, in response to the application switching performed in step S22, the silent mode (restriction mode) set in step S14 is cancelled. At the same time, in response to the remote request for canceling the silent mode, the request being received in step S18, the mobile phone 1 is brought into a state where the restriction mode (e.g., silent mode) is not set.

FIG. 6 is a flowchart illustrating a process 600 performed to restore settings of the silent mode when main power is turned ON according to an embodiment of the disclosure. The settings may be lost, for example, when the rechargeable battery is removed and reinserted again and main power is turned ON. When the fake communication mode is cancelled, if a rechargeable battery is removed and replaced before settings of the restriction mode (e.g., silent mode) are restored to the original settings, then the settings backed up in step S3 or step S13 (described above) are not referenced and restored. As a result, the settings of the restriction mode (e.g., silent mode) remain the same as those forcibly set by the fake communication application B, and thus are not those intended by the user. To prevent such a situation, when the main power is turned ON, process 600 restores settings of the restriction mode as illustrated in FIG. 6.

When the main power is turned ON (step S31), the process 600 determines whether settings of, for example, the silent mode are backed up (step S32). If there are backed-up settings (YES branch in step S32), the process 600 restores settings to the backed-up settings (step S33). Then, the process 600 deletes the backed-up settings (step S34).

This way, if an event involving an alert operation occurs (i.e., if an interrupt occurs when an application starts) in the fake communication mode, the alert operation associated with the event is restricted. Thus, since the user is not disturbed by the alert operation, it is possible to reduce user discomfort.

In the above description, the phrase "the same operation as that performed upon receipt of a real incoming call" refers to an operation that is set in advance for the mobile phone 1 as an operation performed upon receipt of an incoming call. Examples of such an operation include outputting a ringtone and causing a light (e.g., LED) to illuminate. Also, in the above description, the phrase "the same operation as that performed during a real call" refers to an operation that is set in advance for the mobile phone 1 as an operation performed during a call. Examples of such an operation include causing a light (e.g., LED) to illuminate.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While at least one exemplary embodiment has been presented in the foregoing detailed description, the present invention is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being included within the scope of the present disclosure as defined by the claims.

What is claimed is:

1. A mobile wireless device comprising:
   a communication unit configured to perform a voice communication;
   a call speaker configured to output a voice in response to the voice communication;
   an operation unit configured to perform a predetermined operation during the voice communication;
   a fake communication mode setting unit configured to set a fake communication mode allowing the predetermined operation to be performed when the communication unit is not performing the voice communication;
   an operation control unit configure to cause the operation unit to perform the predetermined operation in the fake communication mode; and
   an alert operation restricting unit configured to restrict an alert operation if an event involving the alert operation occurs in the fake communication mode.

2. The mobile wireless device according to claim 1, wherein the event comprises at least one of the group consisting of: when a set time is reached, an incoming call, and an incoming e-mail message.

3. The mobile wireless device according to claim 1, wherein the alert operation restricting unit is configured to restrict the alert operation if a sound event occurs during the fake communication mode, wherein the sound event comprises an alert operation comprising an output of a sound.

4. The mobile wireless device according to claim 1 further comprising an external output speaker, wherein the external output speaker is configured to output a sound to an exterior of the mobile wireless device.

5. The mobile wireless device according to claim 4, wherein the sound comprises an alert operation sound if an event involving the alert operation occurs.

6. The mobile wireless device according to claim 4, wherein the alert operation restricting unit is configured to restrict the output of the sound from the external output speaker if the event involving the alert operation occurs during the fake communication mode and if the alert operation is related to the output of the sound.

7. The mobile wireless device according to claim 1, wherein the alert operation restricting unit is further configured to perform control during restricting the alert operation such that an alert indicating the occurrence of the event is provided by a sound from the call speaker.

8. The mobile wireless device according to claim 1, further comprising a restriction mode setting unit configured to set a restriction mode for the alert operation restricting unit, wherein the alert operation restricting unit sets the restriction mode when the fake communication mode is set.

9. The mobile wireless device according to claim 8, wherein the restriction mode restricts at least an alert operation involving an output of a sound, if an event involving the alert operation occurs.

10. The mobile wireless device according to claim 8, further comprising a restoring unit configured to store and restore settings of the restriction mode.

11. The mobile wireless device according to claim 10, wherein the restoring unit is further configured to store settings being used before the fake communication mode is set.

12. The mobile wireless device according to claim 11, wherein the restoring unit is further configured to restore settings of the restriction mode to the stored settings when the fake communication mode is cancelled.

13. The mobile wireless device according to claim 1, further comprising an event occurrence alert unit configured to provide an alert indicating the occurrence of a restricted event in response to cancellation of the fake communication mode, wherein the restricted event comprises an event for which the alert operation has been restricted during the fake communication mode.

14. A mobile wireless device, comprising:
   a communication unit configured to receive a communication;
   means for performing an alert operation when the communication is received by the communication unit;
   means for performing a fake communication;
   means for restricting the alert operation if an event involving the alert operation occurs during the fake communication; and
   means for controlling an alert which provides notification in response to a reception of the communication by the communication unit during the fake communication.

15. The mobile wireless device according to claim 1, wherein the alert operation comprises at least one of outputting a sound, lowering a sound volume, setting a vibrator to vibrate, causing a lamp to light up, displaying an alert message, illuminating a light-emitting unit, and displaying information on a display.

* * * * *